United States Patent
O'Meara

(10) Patent No.: US 6,838,865 B2
(45) Date of Patent: Jan. 4, 2005

(54) METHOD AND APPARATUS FOR BRANCHING A SINGLE WIRE POWER DISTRIBUTION SYSTEM

(75) Inventor: Kevan T. O'Meara, Chatsworth, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/437,735

(22) Filed: May 14, 2003

(65) Prior Publication Data

US 2004/0227500 A1 Nov. 18, 2004

(51) Int. Cl.[7] ............................................. G05B 24/02
(52) U.S. Cl. ....................................................... 323/328
(58) Field of Search ................................. 323/318, 328, 323/349, 350, 352, 355; 340/850, 852

(56) References Cited

U.S. PATENT DOCUMENTS

| | | | | |
|---|---|---|---|---|
| 5,117,635 A | * | 6/1992 | Blau ............................ | 60/668 |
| 5,230,215 A | * | 7/1993 | Nagata ........................ | 60/502 |
| 5,440,176 A | * | 8/1995 | Haining ....................... | 290/54 |
| 5,489,897 A | * | 2/1996 | Inoue ..................... | 340/870.39 |
| 6,257,162 B1 | * | 7/2001 | Watt et al. ................... | 114/244 |

* cited by examiner

Primary Examiner—Matthew V. Nguyen

(57) ABSTRACT

In a single wire underwater power distribution system, parallel branching nodes are added in a manner that makes the branch connection and branch line look like a series node to the shore based power source. The primary side of a DC—DC converter functioning as an ideal transformer working down to DC is connected into the series line where a branching series line is desired. One side of the secondary creates the branched series path. The other side of the secondary goes to seawater ground, establishing a new local seawater ground.

18 Claims, 3 Drawing Sheets

METHOD AND APPARATUS FOR BRANCHING A SINGLE WIRE POWER DISTRIBUTION SYSTEM

BACKGROUND OF THE INVENTION

1. Field of the Invention

The present invention relates generally to improvements in long underwater power distribution systems for sonar and other sensor systems, and more particularly pertains to a new and improved method and apparatus for branching a single wire underwater power distribution system.

2. Description of the Prior Art

A typical prior art single wire power distribution system 11 is shown in FIG. 1 wherein power is supplied to a plurality of nodes 13, 15 and 17 located under the ocean 25 (saltwater). The nodes are typically sonar or other transducer or sensor systems which require a source of power emanating from a shore or ship based power source 12. These prior art power delivery systems which utilize underwater cable have been optimized for use with a single wire 21 using the seawater 25 itself as a return 23. This approach minimizes cable weight because only one power wire instead of two is needed. Moreover, the seawater provides a lower resistance return path than an actual wire would for long runs.

In the prior art system illustrated in FIG. 1, power flow is from a shore based power source 12 through the conductive wire 21 in the cable, through each instrument and associated electronics node 13, 15 and 17 until the end of the cable is reached. At the end of the cable, a low impedance connection 19 is made to the seawater 25. This particular method efficiently delivers power over any length of cable to any desired number of instruments or electronic clusters (nodes). Typically, the power source on shore or ship is a constant current source with voltages supplied as required by each series node.

The disadvantage of this prior art series power delivery system is that it prevents the power conductor 21 from branching at any location along its length. The power source 12 located on shore or on a ship is a constant current source. If a branch or wire connection were to occur in the conductor 21, the current flow in each branch would be indeterminate. Both branches would be connected by low impedance 19 and 33, respectively, to the seawater for return. As shown in FIG. 2, branching the current path at point 27, for example, causing a single conductor 31 branch having a single node 29 therein with a lower voltage drop to receive all the current, while the other branch 21 with two nodes 13 and 15 therein, with a higher voltage drop, would receive no current. Such a parallel path system would not work.

And yet in many cases, a series only connection of electronic nodes is not optimum. For example, if an area of the ocean is to be populated with an evenly spaced grid of instruments such as shown in FIG. 3, a series only connection scheme would require the cable to zigzag back and forth many times between the various nodes 13, 15, 17, 35 and 37, increasing power loss and installation cost.

A shorter total cable length would be obtained if series and parallel node connections are allowed as shown in FIG. 4. As can be seen from FIG. 4, the parallel branching connections provide for a minimum of cable length for any installation. However, a direct implementation of a parallel path system will not work, as discussed above.

Furthermore, cable installation is frequently required to be modified at some later date. If all the nodes are in series, such modification becomes very difficult. New nodes may only be added at the end of a cable. Adding new nodes in the middle, at the beginning or off to one side of the cable is difficult to the point where it might be easier to redeploy an entirely new cable. This procedure is very costly since the cable itself, and its deployment in the ocean are the largest single system cost.

The present invention method and apparatus of allowing parallel branches to be effectively placed in series with any other branch while still maintaining the basic power delivery requirements permit more flexibility and better cable usage by allowing wide branching to provide a treelike structure, more efficient coverage, i.e., less cable use over a given area is provided. Moreover, the cable does not have to wind back and forth to cover a certain shaped area. The cable length is minimized, thereby minimizing insulation costs. Moreover, minimizing cable length minimizes power loss as the result of the cable resistance which is proportional to the length.

The present invention also allows relatively easy modification of the original installation. Simply cutting the cable at any location along the main branch, a parallel branch may be introduced. If desired, provisions may be made at the time of installation of the main branch to add parallel branches in the future, further simplifying the future modification of the main branch while minimizing expenditures required for expansion.

SUMMARY OF THE INVENTION

A method of creating parallel sub-branch connections to a single wire power distribution system without changing the electrical characteristic of the main branch as a series line is obtained by using a DC—DC converter to connect the sub-branch to the main branch. The primary side of the DC—DC converter is connected in series with the main branch. One side of the secondary connects to the new sub-branch. The other side of the secondary is connected to seawater ground.

BRIEF DESCRIPTION OF THE DRAWINGS

The exact nature of this invention as well as its objects and advantages will be readily appreciated upon consideration of the following detailed description when considered in conjunction with the accompanying drawings in which like reference numerals designate like parts throughout the figures thereof and wherein.

DETAILED DESCRIPTION OF THE PREFERRED EMBODIMENTS

Figure 1:
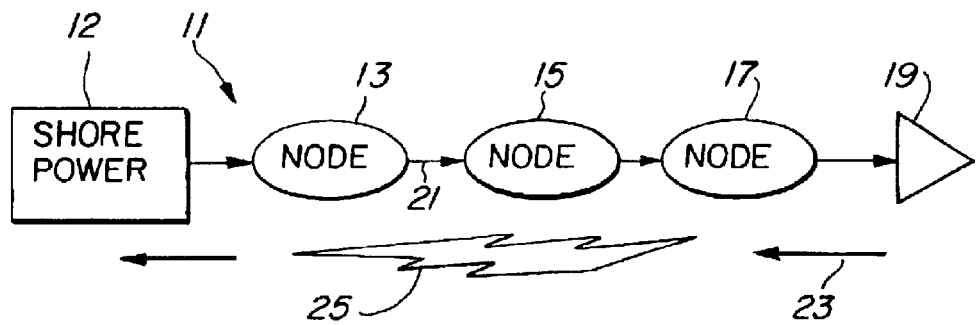
FIG. 1 is a diagrammatic illustration of a prior art series power distribution system.
Figure 2:
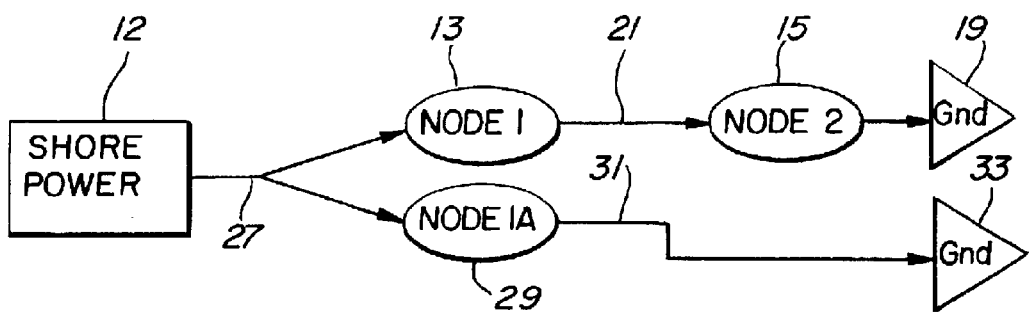
FIG. 2 is a diagrammatic illustration of a prior art parallel power distribution system.
Figure 3:
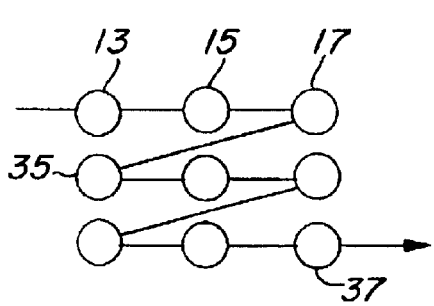
FIG. 3 is a conceptual drawing of a prior art series power distribution system.
Figure 4:
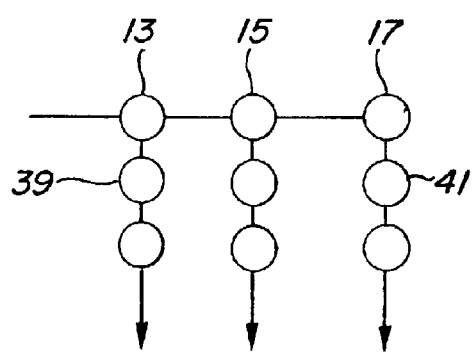
FIG. 4 is a conceptual drawing of a combination series and parallel power distribution system which is achievable by the present invention.
Figure 5:
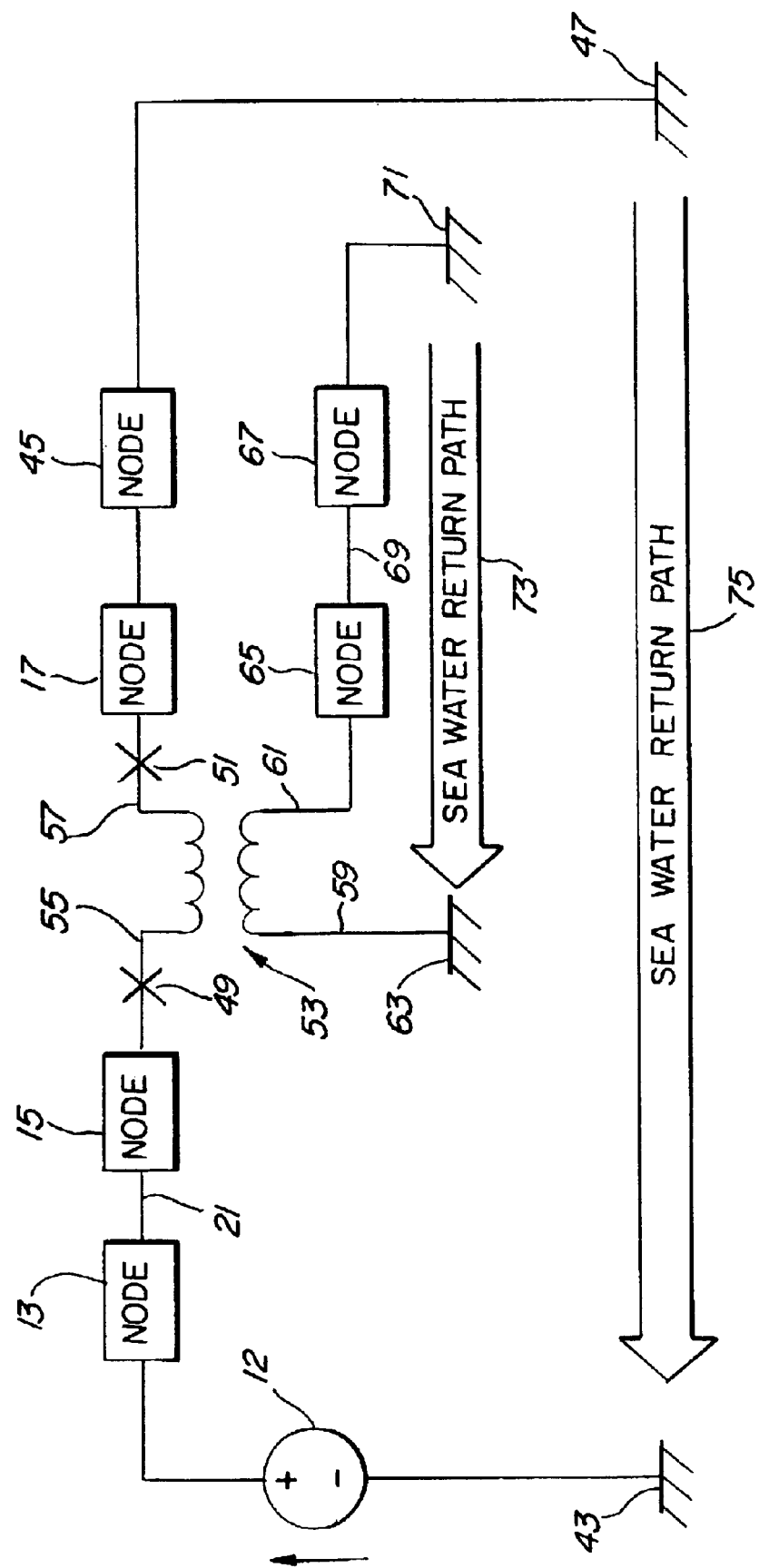
FIG. 5 is a diagrammatic illustration of a preferred embodiment of a branching single wire power distribution system according to the present invention.

The conceptual layout of sensors as shown by the nodes 13, 15, 17, 39 and 41 of FIG. 4 is readily achievable by utilizing the concepts of the present invention as illustrated in FIG. 5.

An active power circuit 53 is inserted into the main branch 21 in series with main branch 21 by connecting to points 49, 51 between nodes 15 and 17, for example. The active power circuit 53 effectively converts a parallel branch connection to what appears to be a series connection to the main power source 12 which may be located on land or on a ship. The active power circuit 53 is essentially a theoretically ideal power transformer wherein the number of turns times the current flow in the primary equals the number of turns times the current flow in the secondary, operating down to DC. Since the currents and voltages are DC, a real transformer which has a limited bandwidth cannot be used. Instead, a DC—DC converter is used which simulates very closely the action of an ideal transformer operating down to DC: Although the following discussion may be in terms of an ideal transformer, it should be understood that a DC—DC converter is being used without any loss of functionality. The two primary leads on the inputs to the DC—DC converter, and the two secondary leads are the outputs.

The primary side of the DC—DC converter 53 is connected into the main branch 21 in series with the nodes 13, 15, 17 and 45 by connecting one end of the primary 55 to insertion point 49 and the other end 57 of the primary to insertion point 51.

The secondary of the DC—DC converter 53 creates a new sub-branch series path 69 by having one end of the secondary 61 connected to a plurality of nodes 65 and 67 in series. The end of this sub-branch 69 is connected to seawater ground 71. The other end 59 of the secondary of transformer 53 is connected to seawater ground 63, thereby creating a new local seawater return path 73 between these two new seawater grounds 71 and 63 for the sub-branch 69.

The main power source 12 is also connected to seawater ground 43 which, together with the seawater ground 47 on the main branch 21, creates the main seawater return path 75 for the entire system.

The use of a DC—DC converter as shown in FIG. 5 to create a parallel branch can be multiplied and stacked, as desired, to create any number of branches off of the main branch or off sub-branches, the result of which is that each branch appears as a series connection in the original branch single conductor cable 21.

The branch and DC—DC converter 53 must be capable of handling the total voltage drop of the new branch and any sub-branches within the new branch as well as the series current of the original branch. The transformer does not have to regulate voltage or current. This simplifies the design of the transformer. Because it operates at a fixed duty cycle, it becomes easy to implement a zero voltage and/or zero current switching. These techniques are well-known and are advantageously used to minimize the size of the device and the noise and ripple of its operation, thereby increasing its overall efficiency. At higher voltages over 95% efficiency is obtainable.

Typical input and output voltages for the branching DC—DC converter would be in the range of several hundred voltages. Typical power levels would be in the multiple hundred watts. Off-the-shelf existing DC—DC converter devices could easily be used to perform within these parameters. These devices are very small relative to the size of the electronic sensors or nodes in the system. Moreover, the costs of such converters are very low compared to overall system cost, making the addition of these branching DC—DC converters to a main branch insignificant from the cost standpoint when considered in comparison to the advantages and savings derived as the result.

Figure 6:
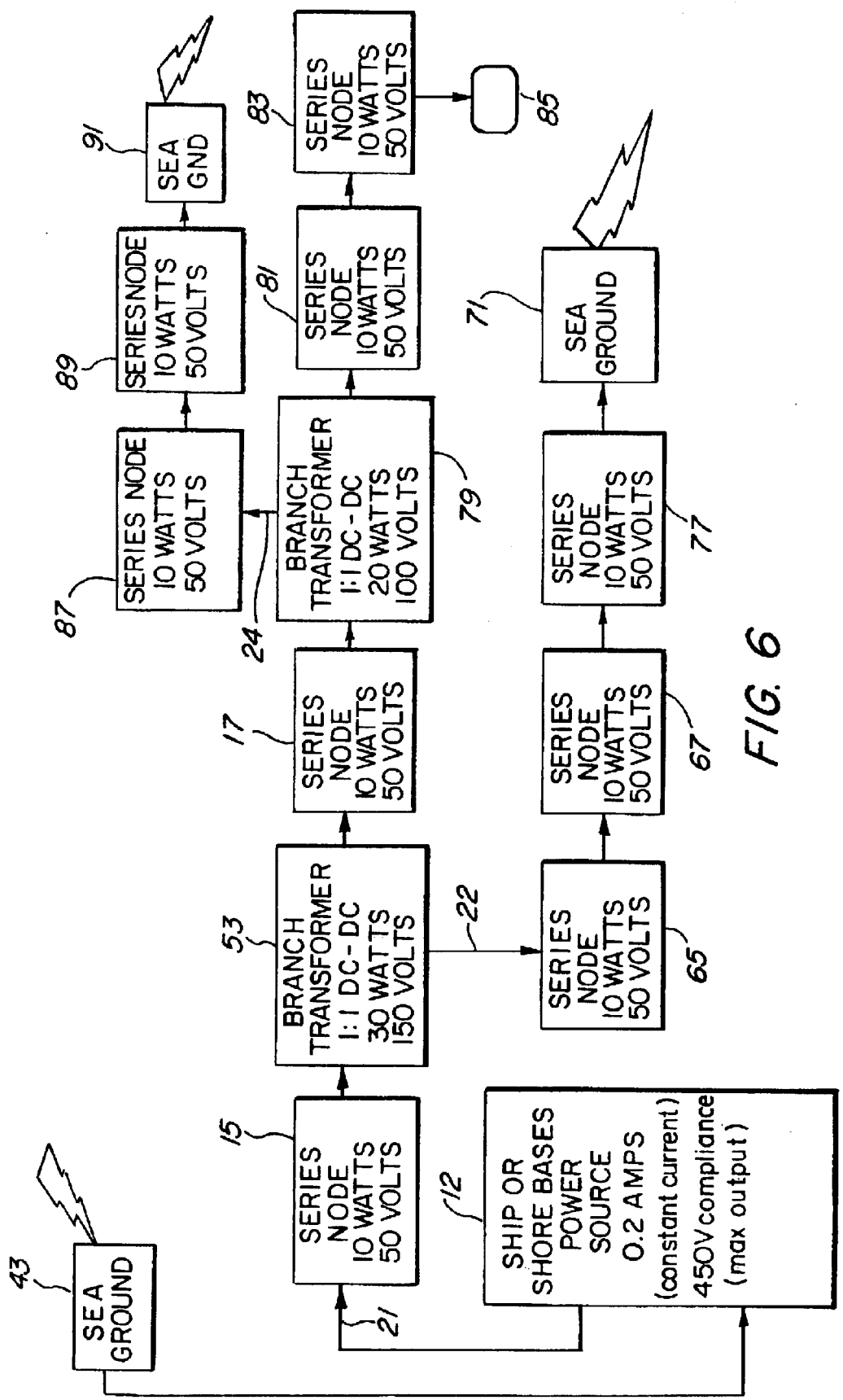
FIG. 6 is a block diagram of a multiple branch single wire power distribution system according to the present invention.

A typical two sub-branch multi-node distribution system is illustrated in FIG. 6. A ship or shore based power source 12 typically generates a constant current of 0.2 amp at a maximum voltage output of 450 volts. The main branch 21 connects to a series of nodes 15, 17, 81 and 83, each node requiring about 10 watts of power and a 50-volt drop. Besides the main branch 21, two sub-branches 22 and 24 are contemplated. Sub-branch 22 has an additional three nodes 65, 67 and 77, each of which requires 10 watts power at a 50-volt drop. Second sub-branch 24 has two nodes 87 and 89, each node having a requirement of 10 watts of power at a 50-volt drop. All three branches, the main branch, the first sub-branch 22 and the second sub-branch 24, are each connected respectively to low impedance sea-ground 85, 71 and 91. Main branch sea-ground 85 interacts with the ship or shore based power source 12, sea-ground 43. The sub-branch sea-ground 71 interacts with the sea ground established by branch DC—DC converter 53. Sea-ground 91 interacts with the sea ground established by branch DC—DC converter 79.

With a total of nine nodes, each at 10 watts, a minimum of 90 watts of power is required.

Branch converter 53 which facilitates the creation of the first sub-branch 22 that has three 10-watt series nodes 65, 67 and 77, is required at minimum to handle 30 watts of power and a total of 150 volts. Branch DC—DC converter 53, because it is operating at near ideal conditions with one-to-one turns ratio and one-to-one voltage and current ratio, has very little power loss, is minimal in size and low in noise.

The second branch DC—DC converter 79, which facilities a second branch 24 having two series nodes 87 and 89 of 10 watts each with 50-volt drops, is required to handle a maximum of 20 watts and 100 volts. This can be easily accomplished by a converter having a one-to-one turns ratio and a one-to-one voltage current ratio with isolated input-to-output coils providing minimal size, high efficiency and low noise operation.

The general rating for each branching DC—DC converter must be equal to or greater than the total branch power required by the nodes and the total branch voltage required by the nodes.

The voltage conversion ratio of the branching DC—DC converter may be adjusted or set to minimize the power consumption of the total cable system with the new sub-branch cable added. Changing the voltage ratio of the branch transformer changes the reflected impedance of the added sub-branch. The voltage ratio of the transformer may then be set to optimize the efficiency of the added sub-branch.

Another advantage of the present invention is that it provides the ability to add fault tolerance features to the cable system. Fault tolerance is important because cutting the main branch at any location will result in the failure of the entire line. The prior art has no way of dealing with such failures. Moreover, failure location and repair are time consuming and expensive.

The branching DC—DC converter of the present invention can be utilized to isolate a sub-branch from the main branch in case of a breach in the sub-branch. The branching DC—DC converters can detect the zero current resulting from a break in the sub-branch. In response, the primary side of the converter can be shorted, allowing the main branch to continue to operate. In a system with a large number of sub-branches, this kind of fault detection and protection feature provides a high degree of fault tolerance. In a system having a number of sub-branches, a single failure may take out any single sub-branch but leave the remainder of the system functioning.

In the prior art system, the current delivered by the shore power supply has an optimum value that minimizes the total system power loss. This optimum value depends on the cable resistance, which is a function of its length. In a similar fashion, the voltage conversion ratio of the branching converter may be set to minimize the power consumption of the total cable system with the new cable added. Changing the voltage ratio of the branching DC—DC converter effectively changes the reflected impedance of the added branch system. By setting the voltage ratio correctly, the efficiency of the added branch may be optimized.

The voltage rating of the cable is a primary limiting factor in the power distribution system. The higher the source shore voltage compliance, the lower the current for the same total power level. The lower the current, the smaller the losses due to the cable resistance. Cable resistance may be hundreds to thousands of ohms over the length of the cable, and is fixed by the available cable.

The maximum voltage is limited by the breakdown voltage rating of the cable (to the seawater). At the shore the cable is subjected to the maximum voltage. The drops, due to the node power supplies and cable resistance, lower the voltage along the length of the cable until the end of the cable is at zero voltage near the end at the sea anchor ground. The below table illustrates this concept.

| Sea End | |
|---|---|
| node | voltage |
| 0 | 0 |
| 1 | 50 |
| 2 | 100 |
| 3 | 150 |
| 4 | 200 |
| 5 | 250 |
| 6 | 300 |
| 7 | 350 |
| 8 | 400 |
| 9 | 450 |
| 10 | 500 |
| 11 | 550 |
| 12 | 600 |
| 13 | 650 |
| 14 | 700 |
| 15 | 750 |
| 16 | 800 |
| 17 | 850 |
| 18 | 900 |
| 19 | 950 |
| 20 | 1000 |
| node | voltage |
| Shore End | |

At a given maximum voltage, and a given cable resistance, there is a maximum power that can be delivered to the electronics. The optimum power delivery is when half the power is delivered to the loads, and half is lost in the cable. For a normal cable power system, efficiency is thus at a maximum of 50%.

Assume that a branch line is to be installed half way down an existing cable. The available voltage at this point is approximately half the maximum shore voltage. The branching DC—DC converter step up ratio may be set to deliver the maximum voltage (as limited by the cable) to the new branch. Effectively, the new branch may be operated with a starting voltage equal to the shore voltage. This maximizes the efficiency of the new branch by maximizing the voltage.

The branching DC—DC converter may also be used to improve the overall efficiency of the system past 50% and extend the maximum line length. An example is shown below.

| MAIN SHORELINE | |
|---|---|
| Sea End | |
| node | voltage |
| 0 | |
| 1 | |
| 2 | |
| 3 | |
| 4 | |
| 5 | |
| 6 | |
| 7 | |
| 8 | |
| 9 | 0 |
| 10 | 500 |
| 11 | 550 |
| 12 | 600 |
| 13 | 650 |
| 14 | 700 |
| 15 | 750 |
| 16 | 800 |
| 17 | 850 |
| 18 | 900 |
| 19 | 950 |
| 20 | 1000 |
| node | voltage |
| Shore End | |

Branch T 2:1 step up

| 1st BRANCH | |
|---|---|
| Sea End | |
| node | voltage |
| 0 | |
| 1 | |
| 2 | |
| 3 | |
| 4 | |
| 5 | |
| 6 | |
| 7 | 0 |
| 8 | 500 |
| 9 | 563 |
| 10 | 625 |
| 11 | 688 |
| 12 | 750 |
| 13 | 813 |
| 14 | 875 |
| 15 | 938 |
| 16 | 1000 |
| node | voltage |
| Mid Cable | |

Branch T 2:1 step up

| 2nd BRANCH | |
|---|---|
| Sea End | |
| node | voltage |
| 0 | 0 |
| 1 | 44 |
| 2 | 150 |
| 3 | 256 |
| 4 | 363 |
| 5 | 469 |
| 6 | 575 |
| 7 | 681 |
| 8 | 788 |
| 9 | 894 |
| 10 | 100 |
| node | voltage |
| Mid Cable | |

The main shoreline cable originally has 20 nodes, after which the source voltage is zero. At the 50% point, a 2:1 step up branching DC—DC converter is used to change the 500 volts back to the original source 1000 volts at the start of the first branch. The first branch could have 15 nodes, allowing a total of 26 notes, or 6 nodes more than the original capability.

Adding another branch at the 50% point of the first sub-branch (again doubling the voltage) allows a total of 28 nodes.

Each additional branch extends the total number of nodes by a smaller and smaller amount. If carried to an extreme with each node having a step up branching transformer, the node count and efficiency (which are directly related) could be increased by a maximum of 50%. By only using one branch, as shown above, the total number of allowable nodes was increased by 30%. The efficiency of the step DC—DC converter must be considered. In the voltage and power levels typically used, efficiencies of over 95% may be obtained.

What is claimed is:

1. A single wire underwater power delivery system, comprising:
   a power source;
   a plurality of nodes in the water requiring power;
   a single conductive wire with a first and a second end connecting the power source at its first end in series with the plurality of nodes in a main branch, with the second end connected to the water; and
   a DC—DC converter connected to the main branch single conductive wire at a selected location between the first and second end and connected to a sub-branch, single conductive wire connected to at least one node.

2. The power delivery system of claim 1 further comprising the sub-branch single conductive wire connecting the node to the water.

3. The power delivery system of claim 1 wherein the DC—DC converter primary is connected in series with the main branch single conductive wire.

4. The power delivery system of claim 3 further comprising one side of the DC—DC converter secondary connected to water and the other side of the DC—DC converter secondary connected to the sub-branch single conductive wire.

5. A single wire underwater power delivery system, comprising:
   a shore based power source connected to water as a ground;
   a plurality of nodes under the water requiring power;
   a single conductive wire with a first and second end connected to the power source at the first end and connected in series with the plurality of nodes in a main branch, the second end of the single conductive wire connected to the water; and
   a first DC—DC converter connected to the main branch single conductive wire at a selected location between the first and second end with the converter primary connected in series with the nodes, and the converter secondary connected to the water at one side of the secondary and to a first sub-branch single conductive wire having a first and second end at the other side of the secondary, the sub-branch wire connected to a node.

6. The power delivery system of claim 5 further comprising a plurality of nodes connected in series by the first sub-branch wire between the first and second end, the second end of the first sub-branch wire connected to the water.

7. The power delivery system of claim 6 further comprising:

a second DC—DC converter connected to the main branch single conductive wire at a selected location between the first and second end with the converter primary connected in series with the nodes and primary of the first converter, and the converter secondary connected to the water at one side of the secondary end to a second sub-branch single conductive wire having a first and second end at the other side of the secondary, the second sub-branch wire connected to a node.

8. The power delivery system of claim 7 further comprising a plurality of nodes connected in series by the second sub-branch wire between the first and second ends, the second end of the second sub-branch wire connected to the wire.

9. A method for branching a single wire underwater power distribution system having a power source, a plurality of nodes in the water requiring power, and a single conductive wire, with a first and second end, connected to the power sources of the first end, and connected in series with the plurality of nodes, the second end connected to the water, the steps of the method comprising:

connecting a DC—DC converter primary at a selected location between the first and second end.

10. The method of claim 9, further comprising the steps of:

connecting the DC—DC converter secondary with one side to the water and the other side to a sub-branch single conductive wire.

11. The method of claim 9 wherein the DC—DC converter primary is connected in series with the nodes.

12. The method of claim 11, further comprising the steps of:

connecting the DC—DC converter secondary with one side to the water and the other side to one end of a sub-branch single conductive wire connecting a plurality of nodes in series.

13. The method of claim 12 wherein the sub-branch single conductive wire is connected to water at another end.

14. The method of claim 13 further comprising the steps of:

connecting a second DC—DC converter primary at a selected location between the first and second end.

15. The method of claim 14, further comprising the step of:

connecting the second DC—DC converter secondary with one side to the water and the other side to a second sub-branch single conductive wire.

16. The method of claim 14 wherein the second DC—DC converter primary is connected in series with the nodes.

17. The method of claim 16 further comprising the steps of:

connecting the DC—DC converter secondary with one side to the water and the other side to one end of a second sub-branch single conductive wire connecting a plurality of nodes in series.

18. The method of claim 17 wherein the second sub-branch single conductive wire is connected to water at another end.

* * * * *